United States Patent
Fyke et al.

(10) Patent No.: US 9,843,607 B2
(45) Date of Patent: Dec. 12, 2017

(54) SYSTEM AND METHOD OF TRANSFERRING CONTROL OF MEDIA PLAYBACK BETWEEN ELECTRONIC DEVICES

(71) Applicant: BlackBerry Limited, Waterloo (CA)

(72) Inventors: Steven Henry Fyke, Waterloo (CA); David Ryan Walker, Waterloo (CA); Jerome Pasquero, Montreal (CA)

(73) Assignee: BlackBerry Limited, Waterloo, Ontario (CA)

( * ) Notice: Subject to any disclaimer, the term of this patent is extended or adjusted under 35 U.S.C. 154(b) by 361 days.

(21) Appl. No.: 13/666,603

(22) Filed: Nov. 1, 2012

(65) Prior Publication Data
US 2014/0122589 A1 May 1, 2014

(51) Int. Cl.
*G06F 15/16* (2006.01)
*H04L 29/06* (2006.01)
(Continued)

(52) U.S. Cl.
CPC ...... *H04L 65/1083* (2013.01); *H04L 65/1069* (2013.01); *H04N 21/41407* (2013.01);
(Continued)

(58) Field of Classification Search
CPC ......... H04L 67/00; H04L 69/00; H04L 29/00; H04L 65/00; H04L 65/1083;
(Continued)

(56) References Cited

U.S. PATENT DOCUMENTS 8,005,987 B2    8/2011  Richardson et al.
2006/0095848 A1*  5/2006  Naik ............................. 715/716
(Continued)

FOREIGN PATENT DOCUMENTS

EP    2495934 A1    9/2012

OTHER PUBLICATIONS

"Media Hub to play Your Music, Photos, and Videos, Anytime, Anywhere", herein after Henry Wayback machine date Mar. 18, 2012.*
(Continued)

*Primary Examiner* — Christopher Biagini
*Assistant Examiner* — Messeret F Gebre
(74) *Attorney, Agent, or Firm* — Fish & Richardson P.C.

(57) ABSTRACT

A system and method for transferring control of media playback between electronic devices. Playback of media content is initiating at a source device and peer-to-peer device pairing is established with a destination device. Media content from the source device is streamed to the destination device and a determination of whether to transfer media playback control to the destination device is made based on characteristics of the media content. The control of media playback may be transferred to the destination device based on the destination device having a local copy of the streaming media content, a playlist with similar characteristics to the streaming media content, a local media content having similar characteristics to the streaming media content, or a local playlist similar to the playlist from the source device. The peer-to-peer device pairing is terminated when media playback control is transferred, thereby preserving battery and processing power to the source device.

17 Claims, 8 Drawing Sheets

(51) Int. Cl.
*H04N 21/414* (2011.01)
*H04N 21/436* (2011.01)
*H04N 21/442* (2011.01)
*H04N 21/482* (2011.01)

(52) U.S. Cl.
CPC ..... *H04N 21/436* (2013.01); *H04N 21/44227* (2013.01); *H04N 21/4825* (2013.01); *H04L 65/4084* (2013.01)

(58) Field of Classification Search
CPC ............ H04L 65/1069; H04L 65/4084; H04N 21/41407; H04N 21/436; H04N 21/44227; H04N 21/4825
USPC .................................................. 709/204, 202
See application file for complete search history.

(56) References Cited

U.S. PATENT DOCUMENTS

| | | | |
|---|---|---|---|
| 2006/0173974 A1 | 8/2006 | Tang | |
| 2006/0239652 A1* | 10/2006 | Liang | 386/96 |
| 2006/0270395 A1 | 11/2006 | Dhawan et al. | |
| 2007/0198682 A1 | 8/2007 | Pazhyannur et al. | |
| 2008/0081558 A1* | 4/2008 | Dunko | G11B 27/002 455/41.1 |
| 2008/0247359 A1 | 10/2008 | Bengtsson et al. | |
| 2009/0027222 A1 | 1/2009 | Larsson et al. | |
| 2010/0169493 A1 | 7/2010 | Yamakawa et al. | |
| 2011/0093583 A1* | 4/2011 | Piemonte et al. | 709/224 |
| 2011/0138331 A1* | 6/2011 | Pugsley et al. | 715/835 |
| 2011/0212688 A1* | 9/2011 | Griffin et al. | 455/41.1 |
| 2013/0218961 A1* | 8/2013 | Ho | 709/204 |
| 2014/0215334 A1* | 7/2014 | Garmark et al. | 715/716 |

OTHER PUBLICATIONS

H. Byun and M. Lee, "A tracker-based P2P system for live multimedia streaming services," 13th International Conference on Advanced Communication Technology (ICACT2011), Seoul, 2011, pp. 1608-1613.*

"2PSM: an efficient framework for searching video information in a limited-bandwidth environment", Hua, K. A. 1 ; Tavanapong, W.; Wang, J. Z. 1999, pp. 396-408.*

V. Hilt, M. Mauve, J. Vogel and W. Effelsberg, "Recording and playing back interactive media streams," in IEEE Transactions on Multimedia, vol. 7, No. 5, pp. 960-971, Oct. 2005.*

Jiangchuan Liu and Jianliang Xu, "Proxy caching for media streaming over the Internet," in IEEE Communications Magazine, vol. 42, No. 8, pp. 88-94, Aug. 2004.*

Extended European search report dated Feb. 6, 2013, in corresponding European patent application No. 12190999.8.

Gizmodo; How Apple's AirPlay Is About to Change Your Life; http://gizmodo.com/5696379/how-apples-airplay-is-about-to-change-your-life; published on Oct. 14, 2011 and retrieved on Oct. 15, 2011.

Voiis Stereo—Wireless Music Gateway; http://global.mobileaction.com/product/Voiis_stereo.jsp#spec; retrieved on Oct. 15, 2011.

XtreneMac intros InCharge Home/Auto BT charging and wireless solutions; http://www.tuaw.com/2011/05/19/xtrememac-intros-incharge-home-auto-bt-charging-and-wireless-sol/; published May 19, 2011 and retrieved on Nov. 1, 2012.

* cited by examiner

SYSTEM AND METHOD OF TRANSFERRING CONTROL OF MEDIA PLAYBACK BETWEEN ELECTRONIC DEVICES

FIELD OF TECHNOLOGY

The present disclosure relates generally to media playback, and more specifically to a system and method of transferring control of media playback between electronic devices.

BACKGROUND

Electronic devices, such as tablet computers and smartphones, may be enabled to play media content such as audio and video content. Conventional electronic devices may share playback of media content with other electronic devices. For example, a smartphone may stream playback of audio content to a car stereo via a Bluetooth™ connection. However, in such playback, the audio content continues playing through the smartphone and is streamed to the car stereo. That is, the smartphone maintains control of the media playback and the car stereo uses a Bluetooth™ connection to play the audio content received from the smartphone. This arrangement consumes battery and processing power of the smartphone. In another example, media playback may be transferred between a smartphone and a laptop computer via a wireless connection when the smartphone and laptop computer share a same media playlist. However, if the smartphone and the laptop computer do not share a same media playlist, control of the media playback will remain with the smartphone and the media content will be streamed to the laptop computer. The smartphone and the laptop may stream content using a wireless connection. Again, this arrangement consumes battery and processing power of the smartphone. Other drawbacks exist.

BRIEF DESCRIPTION OF THE DRAWINGS

A description is provided herein with reference to specific examples illustrated in the appended drawings. These drawings depict only example implementations of the disclosure and are not intended to limit the scope of the disclosure.

DETAILED DESCRIPTION

Figure 1:
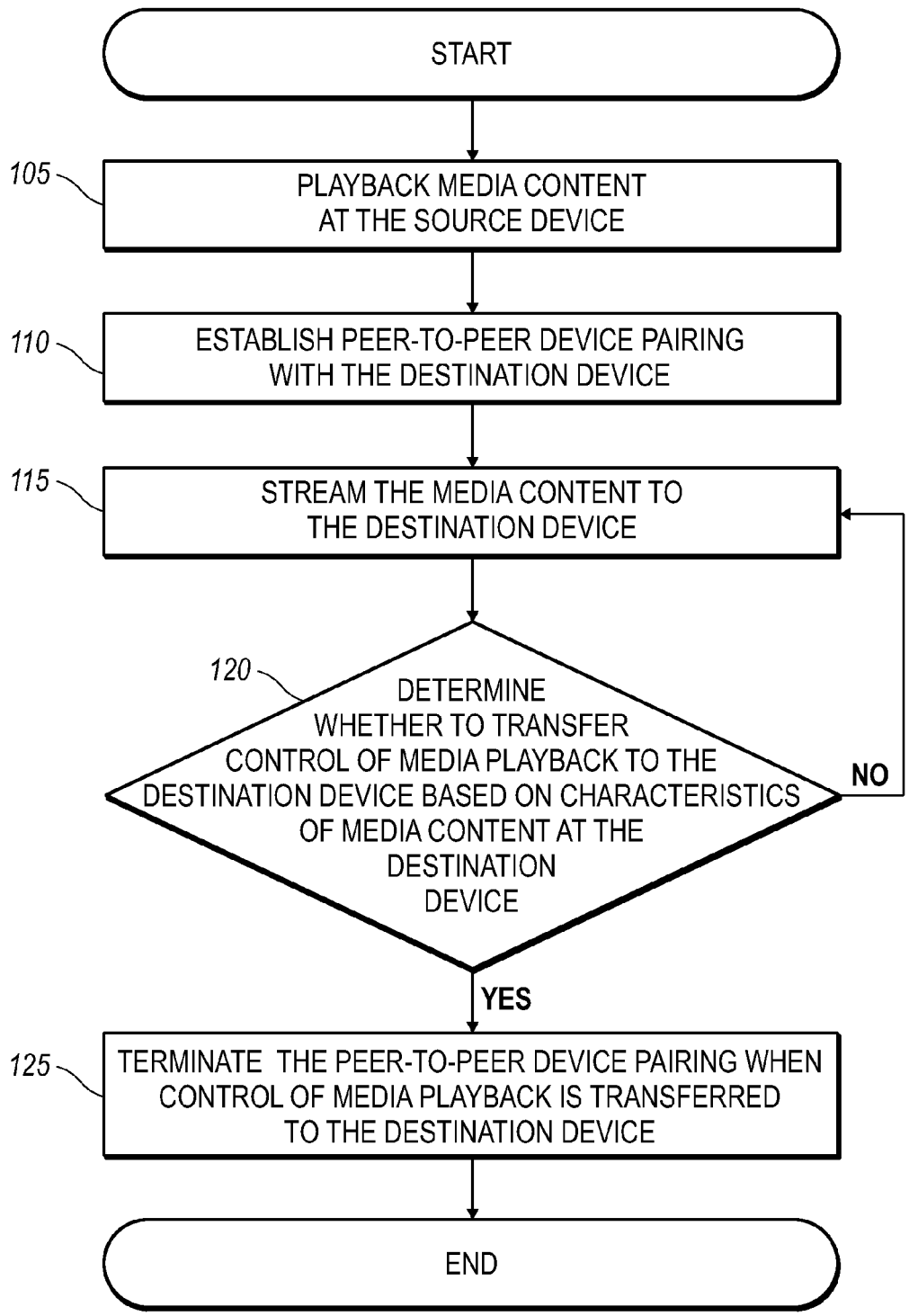
FIG. 1 is a flow chart illustrating a process for transferring media playback control between electronic devices according to one example implementation.

Various examples are provided herein. While specific examples are discussed, it should be understood that this is for illustration purposes only. A person skilled in the relevant art will recognize that other components and configurations may be used without departing from the spirit of the disclosure.

Several definitions that apply throughout this document are now presented. The phrase "coupled" is defined as connected, whether directly or indirectly through intervening components, and is not necessarily limited to physical connections. Coupled devices are devices which are in signal communication with one another.

The term "electronic device" is defined as any device that is capable of at least accepting data, transmitting data, and executing commands. For example, electronic devices may include, but are not limited to, portable communication devices, mobile communication devices, mobile computers, smartphones, computing pads, tablet computers, personal computers, desktop computers, laptop computers, netbooks, servers, routers, set-top phones, or other electronic devices capable of at least accepting data, transmitting data, and executing commands.

The term "media content" is defined as any audio, video, audiovisual content, or the like. Media content may include, but is not limited to, music, movies, animation, ringtones, portions of music, portions of videos, or the like.

The phrase "peer-to-peer device pairing" is defined as any connection, wired or wireless, between two electronic devices. Data may be transferred between the peer-to-peer device pairing. Examples of peer-to-peer device pairings may include, but are not limited to, a Bluetooth™ connection, a near-field-communication (NFC), a peer-to-peer near-field-communication (P2P-NFC), a Wi-Fi connection, a WLAN connection, a LAN connection, a tethered connection, or any other wired or wireless connection that allows for the transfer of data between at least two electronic devices.

Systems and methods are provided for transferring media playback control between electronic devices while media content is streaming between a source electronic device and a destination electronic device. According to one example, the source electronic devices may include mobile electronic devices that offer enhanced mobility options, with limited battery play time, limited media playback options, and restricted bandwidth availability, or the like. According to another example, the destination electronic devices may include home stereo devices, car stereo devices, and home video devices, or the like, which offer rich media content experiences with substantially unlimited play time, but limited mobility options. Alternatively, the source electronic devices may offer substantially unlimited play time and the destination electronic devices may include mobile electronic devices.

Upon establishing a peer-to-peer device pairing between the source electronic device and the destination electronic device, and while the media content is streaming, data associated with the streaming media content may be evaluated. The data may include characteristics of the media content such as a file format, a context, a title of the media content, playlist data associated with the media content, a beats per minute (BPM), a bit rate, an album name, a release date, a genre, an artist, a director, or the like. A decision to transfer media playback control between the electronic devices may be initiated to reduce processor utilization on an electronic device, conserve battery power, enhance a media content experience, and enable mobile operability, among other reasons.

Depending on results of this evaluation, a decision is made on whether to transfer media playback control between the source electronic device and the destination electronic device. A decision to transfer media playback control may be based on availability of media content at the destination electronic device that matches media content streaming from the source electronic device. Alternatively, a decision to transfer media playback control between the source electronic device and the destination electronic device may be based on availability of media content at the destination electronic device having characteristics similar to media content streaming from the source electronic device. If a decision is made to transfer media playback control between electronic devices, the peer-to-peer device pairing may be terminated and the destination electronic device takes control of the media playback. Transfer of media playback control may be performed while the media content is streaming from the source electronic device to the destination electronic device or during breaks in media content streaming.

Alternatively, if a decision is made to maintain media playback control at the source electronic device, then the peer-to-peer device pairing may be maintained and the destination electronic device may be configured as a slave device. Under this condition, a decision on whether to transfer media playback control may be periodically re-evaluated to determine suitable conditions for transferring media playback control to the destination electronic device.

A timing determination of when to transfer media playback control between the electronic devices may be based on a comparison of the media content stored at the source electronic device and the destination electronic device. If the source electronic device and the destination electronic device have access to the same media content, then the transfer may occur substantially immediately. If the source electronic device and the destination electronic device have access to media content with similar characteristics, then the transfer may occur during breaks between the media content. If the source electronic device and the destination electronic device have access to substantially different media content, then the transfer may be user-initiated based on a prompt provided to a graphical user interface.

According to one example, media playback control may be transferred to the destination electronic device when a determination is made that the destination electronic device is locally storing a copy of the media content streaming from the source electronic device. Alternatively, if a determination is made that the destination electronic device is not locally storing a copy of the media content streaming from the source electronic device, the source electronic device may maintain media playback control and may continue streaming the media content until a determination is made to transfer media playback control at a later time.

While the source electronic device is streaming media content to the destination electronic device, the destination electronic device may select a second media content item (for example, a next media content item) to play at the destination electronic device. The destination media content item may be selected based on the media content streaming from the source electronic device. Upon a completion the media content streamed by the source electronic device, media playback control may be transferred to the destination electronic device. The peer-to-peer device pairing may be terminated when media playback control is transferred to the destination electronic device. The second media content item may be played when media playback control is transferred to the destination electronic device. Since media playback control may be transferred to the destination electronic device when media content streaming from the source electronic device is locally stored at the destination electronic device, media content playback is uninterrupted and seamless during transfer of media playback control.

Figure 2:
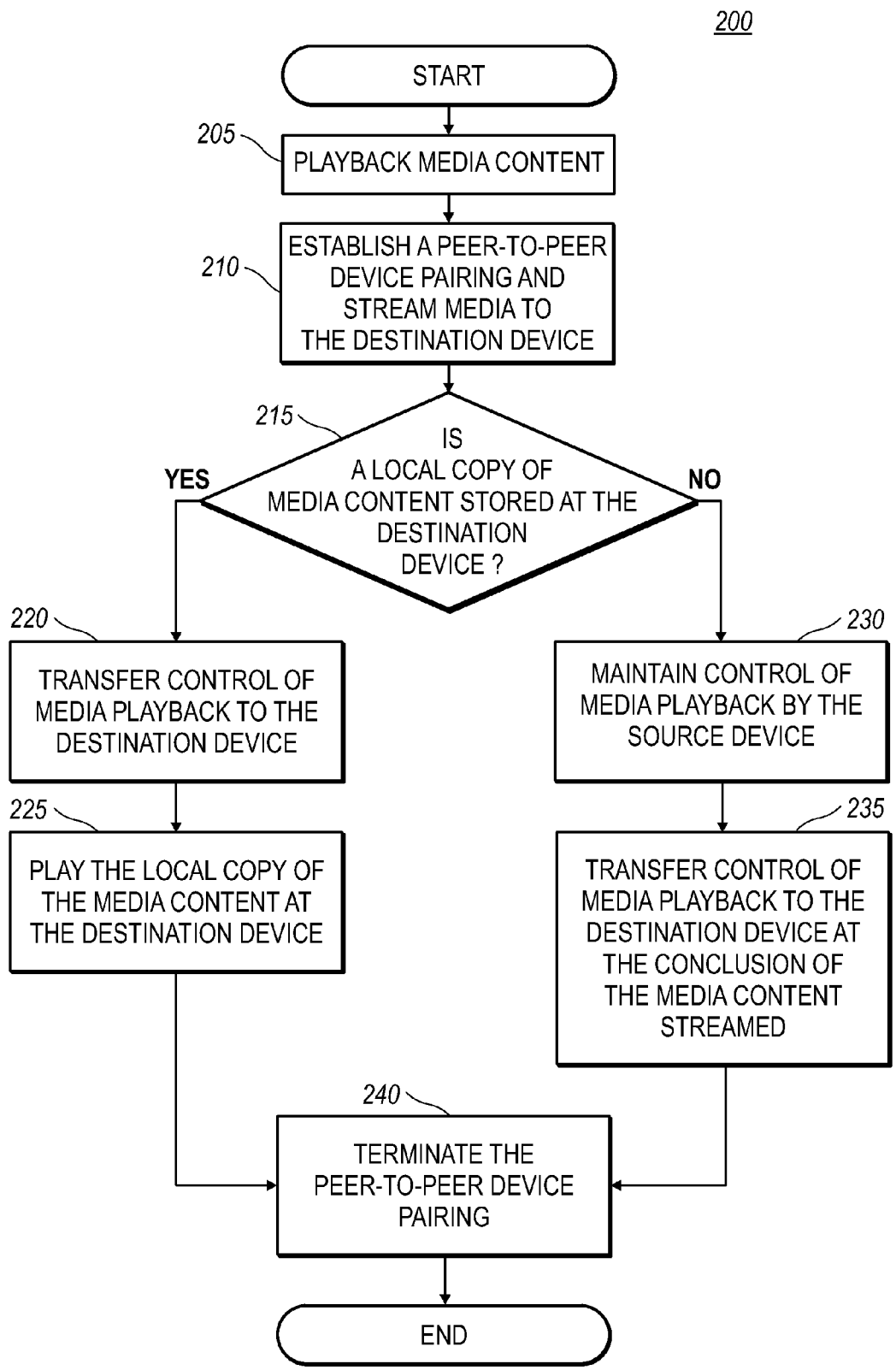
FIG. 2 is a flow chart illustrating a process for transferring media playback control between electronic devices according to another example implementation.

Various examples of methods and systems for transferring media playback control between electronic devices are described with reference to FIGS. 1-8. While FIGS. 1 and 2 illustrate a particular order of steps, one of those of ordinary skill in the art will appreciate that the steps may be executed in any order to accomplish the technical advantages of the present disclosure and may include fewer or more steps than illustrated. Each block represents one or more processes, methods or subroutines. The steps may be implemented in a system that includes the source electronic device and the destination electronic device. The source electronic device and the destination electronic device may be smartphones, electronic tablets, stereo systems, automobile stereos or any other type of electronic device capable of at least accepting data, transmitting data, and executing commands. The source electronic device and the destination electronic device may be of the same or different types of electronic devices. For example, different types of electronic devices include audio devices, video devices, data transfer devices, or the like. Each block shown in FIG. 1 may be carried out by a processor 305 of the source electronic device 300. The processor 305 illustrated in FIG. 3 may include one or more processors or one or more processing systems communicatively coupled to the source electronic device. The flow charts illustrated in FIGS. 1 and 2 will be described with reference to FIG. 3.

FIG. 1 illustrates a method 100 that begins at block 105 with playback of media content. For example, a media player application may communicate with a processor 305 on the source electronic device 300 to play the media content. At block 110, a peer-to-peer device pairing may be established between the source electronic device 300 (hereinafter "source device 300") and the destination electronic device 350 (hereinafter "destination device 350"). For example, the processor 305 may execute instructions to establish the peer-to-peer device pairing. In one example, the peer-to-peer device pairing may be established using a near field communication (NFC) connection. The peer-to-peer device pairing may be established in response to a selection of a peer-to-peer device pairing application at the source device 300.

In another example, the peer-to-peer device paring may be established in response to a detected proximity between the source device 300 and the destination device 350. For example, the detected proximity may include placing the source device 300 and the destination device 350 within a predetermined distance from each other. Alternatively, the peer-to-peer device pairing may be established by physical contact between the source device 300 and the destination device 350. The physical contact may include, for example, a swipe of the source device 300 against the destination device 350 (or vice versa); a wave of the source device 300 adjacent the destination device 350 (or vice versa); a tap of the source device 300 against the destination device 350 (or vice versa); or any other contact input between the source device 300 and the destination device 350 indicative of a desire to transfer media playback therebetween. Upon establishing the peer-to-peer device pairing, the method may proceed to block 115.

At block 115, the source device 300 streams media content to the destination device 350 and controls playback of the media content at the destination device 350. In other words, a master and slave configuration may be established so that the destination device 350 plays media content streamed from the source device 300. According to one example, the source device 300 may transmit control data to the destination device 350 while streaming the media content. For example, the control data may be transmitted by the source device 300 via the peer-to-peer device pairing. The control data may include characteristics associated with the media content streamed from the source device 300. Characteristics may include a context, a file format, a title of the media content, playlist data associated with the media content, a beats per minute (BPM), a bit rate, an album name, a release date, a genre, an artist, a director, or any other characteristics associated with media content. In another example, the control data is transmitted from the source device 300 and may include a request confirming whether the destination device 350 can access a copy of the media content streaming from the source device 300. The confirmation procedure is described below with reference to FIG. 2. Once the media content is streaming to the destination device 350, the method may proceed to block 120.

At block 120, a determination is made whether to transfer control of media playback from the source device 300 to the destination device 350. The determination may be based on characteristics of the media content available to the destination device 350. For example, the determination may be based on characteristics of media content stored locally at the destination device 350 or accessible to the destination device 350. The determination may be based on characteristics of media content stored at the destination device 350 that match the characteristics of media content, such as a song 515 (see FIG. 5), currently streaming from the source device 300. As discussed above, the characteristics may correspond to individual media content items, playlists, folders of media content, albums, media content libraries, or the like.

In one example, the processor 305 at the source device 300 may receive destination data from the destination device 350 to determine a degree of similarity between media content accessible to the destination device 350 and media content streaming from the source device 300. The destination data may be evaluated to confirm that media content at the destination device 350 matches the streaming media content. The destination data may be evaluated to confirm that media content at the destination device 350 does not match the streaming media content. Further still, the destination data may be evaluated to determine: whether the media content at the destination device 350 is similar to the streaming media content; whether playlists stored on the destination device 350 include media content items similar to the streaming media content; whether another version of the streaming media content is locally stored at the destination device 350; or the like. Based on results of this evaluation, control of media playback may be transferred between the source device 300 and the destination device 350 to provide a smooth and seamless change of control, without interruption to the playback of the media content. Upon transferring control of media playback to the destination device 350, the method may proceed to block 125.

At block 125, the peer-to-peer device pairing may be terminated when control of media playback is transferred to the destination device 350. The processor 305 of the source device 300 may terminate the peer-to-peer device pairing upon transferring control the playback of media to the destination device 350. In this way, battery consumption is reduced and processing power is enhanced at the source device 300.

FIGS. 2-7 provide examples for transferring media playback control from the source device 300 to the destination device 350. FIG. 2 illustrates another example method of transferring control of media playback based on the media content being locally stored at the destination device 350. The method 200 begins at block 205 with playback of media content. For example, a media player application may communicate with a processor 305 on the source electronic device 300 to play the media content. At block 210, a peer-to-peer device pairing may be established between the source device 300 and the destination device 350. Continuing at block 210, the source device 300 streams media content to the destination device 350 and controls playback of the media content at the destination device 350.

At block 215, a determination is made of whether the media content streaming from the source device 300 is locally accessible to the destination device 350. For example, the processor 305 may transmit control data to the destination device 350 requesting confirmation of whether or not a local copy of the media content streaming from the source device 300 is stored at the destination device 350. In another example, the processor 305 of the source device 300 may transmit control data requesting the destination device 350 to search locally or within a network for media content that matches the media content streaming from the source device 300. The processor 305 may establish a peer-to-peer device pairing and transmit control data requesting the destination device 350 to search local storage media and storage media communicatively coupled to the destination device 350 for a copy of the media content streaming from the source device 350.

A determination is made that a local copy of the streaming content is accessible to the destination device 350 based on a comparison of characteristics of the streaming media content and characteristics of media content stored at the destination device 350. The determination may be made by the processor 305 of the source device 300, the processor 355 of the destination device 350, a user, or any other entity or device that is associated with playback of the media content. Media playback control may be transferred in response to a determination that at least one media content item stored at the destination device 350 matches characteristics of the streaming media content.

If a local copy of the streaming media content is stored at the destination device 350, the method may proceed to block 220 where control of media playback may be transferred from the source device 300 to the destination device 350. In one example, control of media playback may be transferred to the destination device 350 immediately after a determination is made that a local copy of the media content streaming from the source device 300 is stored at the destination device 350. In another implementation, the source device 300 may transmit buffer data to buffer playback of the media content at the destination device 350 until the local copy of the streaming media content is obtained at the destination device 350. The source device 300 may stream the media content to the destination device 350 until the local copy of the media content at the destination device 350 is retrieved. The buffer data may include five seconds of media playback, ten seconds of media playback, thirty seconds of media playback, one minute of media playback, or any other time period of media playback needed until the local copy of the streaming media content is retrieved. When the local copy of the streamed media content is retrieved, the source device 300 may terminate streaming the media content and transfer control of media playback to the destination device 350. After control of media playback is transferred to the destination device 350, the method 200 may proceed to block 225, where the destination device 350 may control playback of the media content and play a local copy of the media content.

After control of media playback is transferred to the destination device 350, the method 200 may proceed to block 240, where the peer-to-peer device pairing may be terminated. In one implementation, the peer-to-peer device pairing may be terminated substantially simultaneously with transferring control media playback to the destination device 350. In another implementation, the peer-to-peer device pairing may be terminated within a short period of time from transferring control of media playback to the destination device 350. For example, the short period of time may be within 0.5 seconds, 1 second, 5 seconds, 10 seconds, 20 seconds, or within any other period of transferring control of media playback to the destination device 350. In another implementation, the peer-to-peer device pairing may be terminated in response to destination data received at the source device 300 indicating that control of media playback transfer to the destination device 350 is successful. For example, the destination data may indicate a successful handover of control of media playback to the destination device 350.

Returning to block 215, if a determination is made that a local copy of the media content streaming from the source device 300 is not stored at the destination device 350, the method may proceed to block 230. At block 230, the source device 300 may maintain control of media playback. For example, the source device 300 may continue streaming the media content to the destination device 350. The source device 300 may control the playback of the media content and transmit media signals associated with the streamed media content, such as audio signals, to the destination device 350. At the conclusion of playing the media content, the method may proceed to block 235.

At block 235, control of media playback may be transferred to the destination device 350. For example, after the media content streaming from the source device 300 concludes, the source device 300 may transfer or hand over control of media playback to the destination device 350, such that the destination device 350 may select to play a second media content item. For example, the destination device 350 may play media content from the destination device 350 after control of media playback is transferred thereto. In another implementation, the destination device 350 may identify a second media content item having characteristics similar to the media content item streaming from the source device 300. For example, the second media content item may have a same artist, a same genre, a same album, be part of a playlist having a similar media content item as the streaming media content, or be part of a same playlist as the streaming media content.

When control of media playback is transferred to the destination device 350, the transfer may be seamless substantially unnoticeable to the user. For example, the transfer maintains a similar listening or viewing experience compared to when the media content was streaming from the source device 300. That is, the user's listening or viewing experience is not interrupted or changed when the control of media playback is transferred to the destination device 350. The method may proceed to block 240 after control of media playback is transferred to the destination device 350. At block 240, the peer-to-peer device pairing is terminated.

Figure 3:
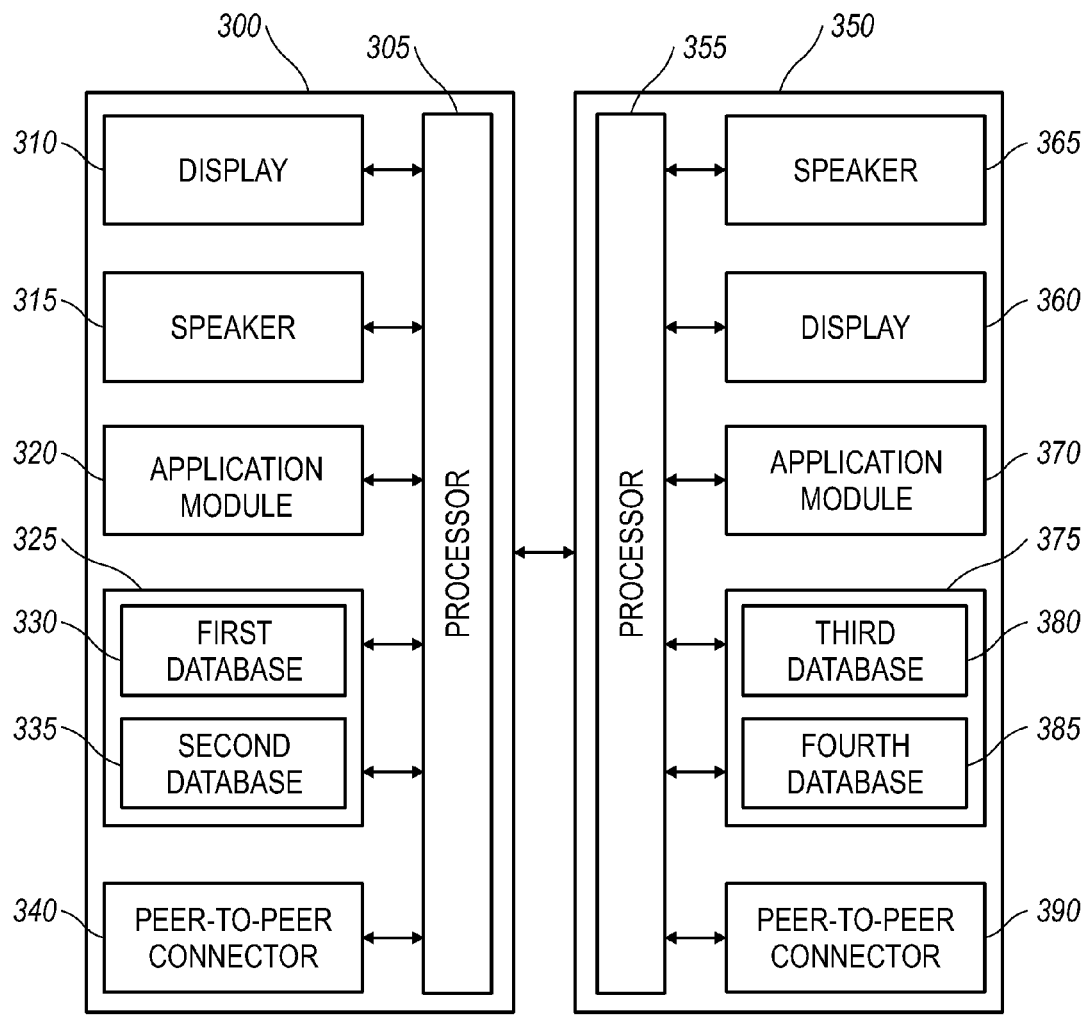
FIG. 3 is a system block diagram for transferring control of media playback control between electronic devices according to one example implementation.

FIG. 3 illustrates a non-limiting example of a system for transferring control of media playback based on local storage of media content. In FIG. 3, system 302 may include a source device 300 and a destination device 350. Each of the source device 300 and the destination device 350 may be a portable communication device, a mobile communication device, a mobile computer, a smartphone, a computing pad, a tablet computer, a personal computer, a desktop computer, a laptop computer, a netbook, a set-top phone, a portable digital assistant (PDA), a DVD player, a portable Blu-Ray® player, a peer-to-peer cable television (for example, a network television), an audio-playback device, a portable music player, a peer-to-peer capable printer (for example, a network printer), or other electronic device capable of at least accepting data, transmitting data, and executing commands. The source device 300 and the destination device 350 may be the same or different types of electronic device.

In FIG. 3, the source device 300 may be a smartphone and may include at least one processor 305 configured to execute instructions for transferring control of media playback. The source device 300 may include a display 310, an audio output 315, and an application module 320. The application module 320 may store a media player application to play media content including audio files, video files, or the like. In other implementations, the application module 320 may be an internet application module that supports a web-based media player, a presentation application module that supports audiovisual files, or any other application module for playing media files.

The source device 300 further may include a computer-readable storage medium 325 that is a non-transitory or a transitory computer-readable storage medium 325. The computer-readable storage medium 325 may be an internal computer-readable storage medium, an external computer-readable storage medium, a portable computer-readable storage medium, or a detachable computer-readable storage medium. For example, the computer-readable storage medium 325 may be any available media that may be accessed by a general purpose or special purpose computer, including the functional design of any special purpose processor as discussed above. By way of example, and not limitation, such non-transitory computer-readable media may include RAM, ROM, EEPROM, CD-ROM or other optical disk storage, magnetic disk storage or other magnetic storage devices, flash memory, or any other medium which may be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium.

The computer-readable storage medium 325 may include a first database 330 and a second database 335. The first database 330 may be a database of media content files. For example, the first database 330 may include one or more audio files, video files, audiovisual files, documents, text files, or any other type of files. The second database 335 may be a database of playlists or playlist data. A playlist may be a grouping of media content. The playlist may be defined by the user or automatically defined. For example, the playlist may include media content grouped based on characteristics, such as a genre, artists, a time period, albums, a mood evoked by the media content, or any other characteristics shared by the media content. In other examples, the playlists may include media content grouped randomly.

The source device 300 may include a peer-to-peer connector 340, such as a peer-to-peer (P2P) device pairing interface, a Bluetooth® interface, a near-field-communication (NFC) interface, a near-field-communication-peer-to-peer (NFC P2P) interface, a Wi-Fi-interface, a tether interface, or any other device or interface which allows the source device 300 to transmit data, such as media content, and receive data from the destination device 350.

While FIG. 3 illustrates the source device 300 with a particular number of components, those of ordinary skill in the art will appreciate that the source device 300 may have fewer or more components than as illustrated, without departing from the technical advantages of the present systems and methods of transferring control of media playback based on local storage of media content.

FIG. 3 also illustrates a destination device 350 that includes a processor 355, a display 360, a speaker 365, an application module 370, a computer-readable medium 375 having a third database (for example, a files database 380) and a fourth database (for example, a playlist database 385), and a peer-to-peer connector 390. Those of ordinary skill in the art will appreciate that the destination device 350 may have more or fewer components.

Figure 4:
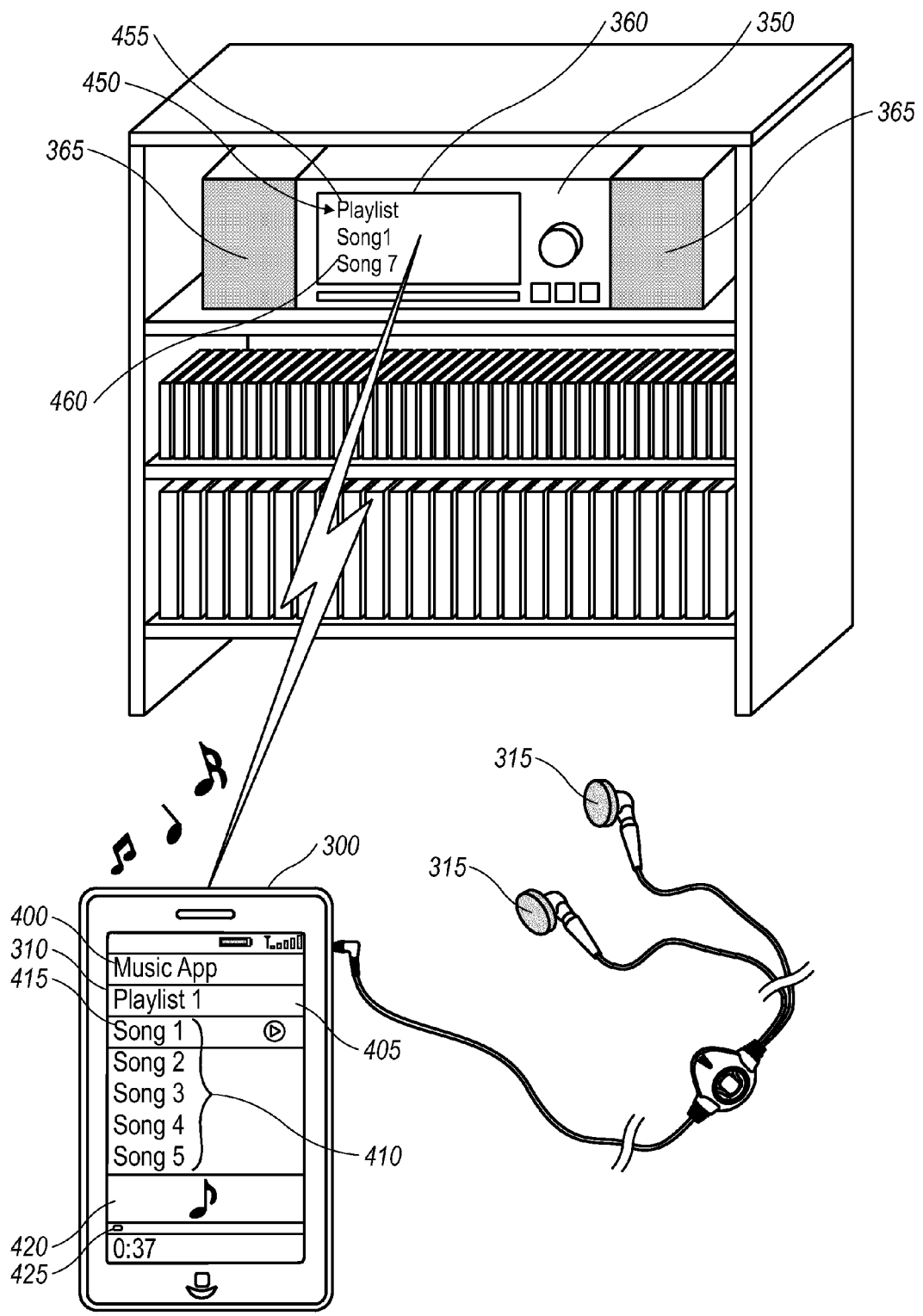
FIG. 4 is an illustration of electronic devices that transfer media playback control in accordance with an example implementation, where the source device is a smartphone and the destination device is a home stereo and where the destination device has a local copy of media content streaming from the source device.
Figure 5:
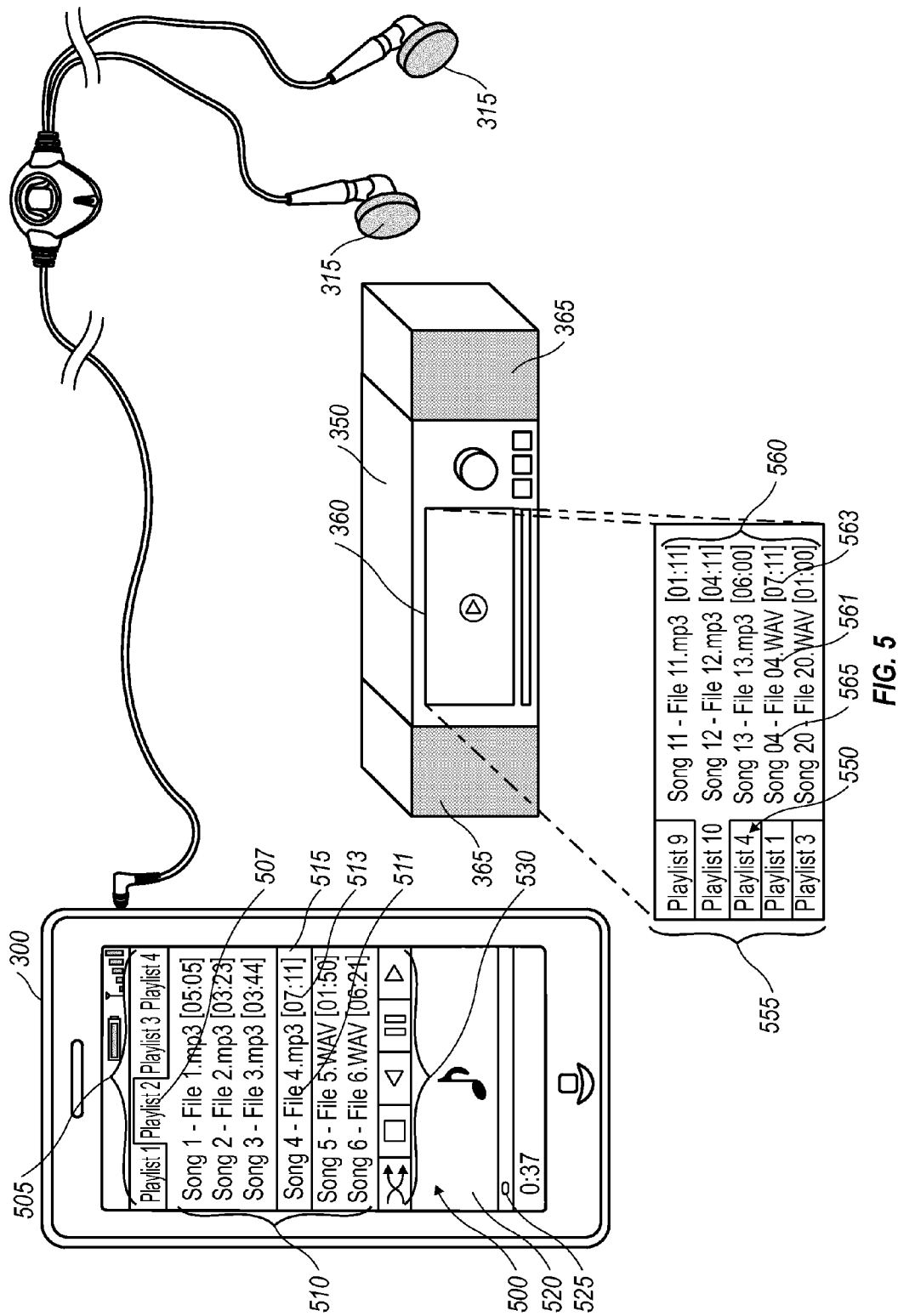
FIG. 5 is an illustration of electronic devices for transferring media playback control in accordance with another example implementation, where the source device is a smartphone and the destination device is a home stereo and where the destination device does not have a local copy of the media content streaming from the source device.

FIGS. 4 and 5 illustrate non-limiting examples of electronic devices that communicate to transfer control of playback of media content therebetween. In FIGS. 4 and 5, the source device 300 is a smartphone and the destination device 350 is a home stereo system. An audio output device 315, such as headphones, may be communicatively coupled to the source device 300. The source device 300 and the destination device 350 may be configured to store a local copy of the same media content item. A graphical user interface (GUI) 400 of a music application is presented on the display 310 and may be manipulated to initiate media playback. The GUI 400 associated with the music application may present a playlist 405 on the source device 300. The playlist 405 is Playlist 1 and includes five songs 410. The GUI 400 may provide an indication that Song 1 in Playlist 1 is currently playing. For example, the indication may include highlighting the currently playing song 415, changing a color of the currently playing song 415 compared to the remaining songs in the playlist 405, presenting an icon adjacent the currently playing song 415, placing a box surrounding a title of the currently playing song 415, or providing any other indication to distinguish the currently playing song 415 from the remaining songs in the playlist 405.

The music application GUI 400 also may include graphical information 420 associated with the playlist 405 or the songs 410 of the playlist 405. The graphical information 420 may include album art, a photo of the artist, an image, detailed information associated with the currently playing song 415 (for example, a song title, artist, album, release date, or any other detailed information), or the like. The music application GUI 400 may display a playback counter 425 identifying the position of a slider bar corresponding to the currently playing song 415. For example, the playback counter 425 illustrates that 37 seconds of the currently playing song 415 has been played.

The destination device 350 illustrated in FIG. 4 is a home stereo system having a display screen 360 and speakers 365. A peer-to-peer device pairing may be established between the source device 300 and the destination device 350. The peer-to-peer device pairing may be automatically established when the source device 300 is within a selected distance from the destination device 350. For example, the peer-to-peer device pairing may be automatically established when the source device 300 is within one inch, five inches, one-half inch, five feet, twenty feet, or any other distance from the destination device 350. The selected distance may be set by the user of the source device 300, the user of the destination device 350, the source device 300, the destination device 350, or any other entity or device associated with transferring control of media playback between electronic devices.

As indicated by the GUI 450 presented on the display 360, a music application may be initiated at the destination device 350 when the peer-to-peer device pairing is established. In other example, the music application may be initiated at the destination device 350 before the peer-to-peer device pairing is established and control data may be received by the music application after the peer-to-peer device pairing is established.

After the peer-to-peer device pairing is established, the source device 300 may stream a media item 415 (for example, a song) to the destination device 350. While streaming the song 415 to the destination device 350, the source device 300 may transmit control data to determine whether to transfer control of media content playback to the destination device 350. The control data provides characteristics of the song 415. Based on the determination, the source device 300 may be granted access to the media content stored at the destination device 350. The source device 300 may then compare the characteristics of the media content stored at the destination device 350 to the characteristics of the song 415 being streamed. During the comparison, the source device 300 may determine whether a local copy of the streaming song 415 is stored at the destination device 350. As discussed above, the determination may be based on the characteristic information of the song 415.

Referring to FIG. 4, a comparison of the Playlist 1 410 illustrated on GUI 400 of the source device 300 and the Playlist 455 illustrated on GUI 450 of the destination device 350 identifies a similar local copy of the currently streaming Song 1. However, the other songs on Playlist 455 are different than the songs on the Playlist 1 410. The source device 300 receives destination data confirming local storage of Song 1 at the destination device 350. In response to receiving the destination data, the source device 300 may transfer control of media playback to the destination device 350. As discussed above, control of the media playback may be immediately transferred such that the destination device 350 plays the local copy of the currently streaming song 415. In this case, the control data includes position information for the song at which media playback control was transferred. The position information is shown by the playback counter 425 on the source device 300 depicting 37-seconds of playback.

In other implementations, the source device 300 may stream buffer data until the destination device 350 retrieves and cues playback of the local copy of song 415 to match the current position of the streaming song 415. For example, the source device 300 may transmit buffer data for the upcoming ten seconds of streaming song 415 corresponding to the time period between the 37-second marker and the 47-second marker. The buffer data allows the destination device 450 to play the currently streaming song 415 while the destination device 450 retrieves and cues the local copy of the streaming song 415 to continue playing from the 48-second marker. That is, the destination device 350 may play the local copy of the currently streaming song 415 from the position immediately following the buffer data streamed from the source device 300.

After control of the media playback is transferred to the destination device 350, the peer-to-peer device pairing between the source device 300 and the destination device 350 may be terminated. In another example, the source device 300 may enter a reduced power mode or power down after the control of media playback is transferred to the destination device 350. In other implementations, the source device 300 may perform any combination of terminating the peer-to-peer device pairing, terminating media content streaming, closing the media application, or powering down in response to transferring control of media playback to the destination device 350. In such implementations, battery power and processing power are conserved at the source device 300 when control of media playback is transferred to the destination device 350 and the peer-to-peer device pairing is terminated. When control of media playback is transferred solely to the destination device 350, the source device 300 is no longer needed to stream, transfer, control, or aid in the playback of media content from the source device 300.

FIG. 5 illustrates another example of electronic devices communicating to transfer control of playback of media content therebetween. A comparison of the Playlist 2 507 illustrated on GUI 500 of the source device 300 and the Playlist 555 illustrated on GUI 550 of the destination device 350 reveals that the destination device 350 does not have a local copy of the media content streaming from the source device 300. In this example, the source device 300 may be a smartphone with a pair of headphones 315 and a display screen XXX. The destination device 350 may be a home stereo system. In other implementations, the destination device 350 may be a portable stereo having a display screen 360 and speakers 365.

The GUI 500 of the music application executing on the source device 300 includes a plurality of playlists 505 illustrated using tabs. The source device 300 streams media content to the destination device 350 and controls media playback of the destination device 350. For example, the source device 300 streams and controls playback of Playlist 2 507 at the destination device 350. Playlist 2 507 includes six songs 510 and Song 4 515 is indicated as currently streaming by a box surrounding the text information associated with the currently streaming Song 4 515. The text information includes the title "Song 4," the file name "File 4.mp3," and a length 515 of the song ("07:11"). The GUI 500 may also include a plurality of selectable icons 530 associated with playback controls. For example, playback controls may include a stop icon, a shuffle icon, a play icon, a forward icon, a back icon, or any other icon by which playback of a song or playlist may be controlled. The GUI 500 may include graphical information 520 and a playback counter 525 indicating that 37 seconds of Song 4 have played.

A peer-to-peer device pairing may be established when the source device 300 is tapped against the destination device 350. In other implementations, the source device 300, the destination device 350, or both the source device 300 and the destination device 350, may have a dedicated button for transferring control of media playback between the source device 300 and the destination device 350. In still other implementations, an icon or option may be selected at the source device 300 to transfer control of media playback between the source device 300 and the destination device 350. In another example, a peer-to-peer device pairing may be established between the source device 300 and the destination device 350 when the devices are within a pre-selected distance of each other. The peer-to-peer device pairing may be initiated using a motion, a gesture input, or any other input to signify transferring control of media playback to source device 300.

After the peer-to-peer device pairing is established, the source device 300 may determine whether to transfer control of media playback to the destination device 350 based on characteristics of media content stored at the destination device 350. The determination is based on a comparison of the characteristics of the media content at the destination device 350 and the source device 300. In one example, the destination device 350 may determine that a local copy of the streaming media item, having a same title 565 and same length 563 as Song 4 515, is stored at the destination device 350. The local media item Song 04 565 includes a different format 561 (WAV) than the format of currently streaming Song 4 515 (MP3). Other formats may be used. Since the local media item Song 04 565 is not the same exact file as Song 4 515 currently streaming from the source device 300, the destination device 350 may transmit destination data indicating an unconfirmed local copy of the currently streaming Song 4 515.

In response to receiving the unconfirmed local copy message, the source device 300 may maintain control and continue streaming playback of the currently streaming Song 4 515 through the destination device 350. The source device 300 may subsequently transfer control of media playback to the destination device 350 after the currently streaming Song 4 515 concludes. While the source device 300 streams Song 4 515 to the destination device 350, the destination device 350 may determine a next song, or a second media item, to play at the destination device 350 upon conclusion of Song 4 515.

The destination device 350 may select the next song based on the characteristics of the currently streaming Song 4 515. For example, the next song may be selected based on having a similar genre, a similar artist, a similar song title, a similar playlist, or any other similarity of characteristics with the currently streaming Song 4 515. If the destination device 350 has a different version or format of the streaming Song 4 515, the next song may be selected from the Playlist 555 at the destination device 350 having a different version of the streaming Song 4 515. In FIG. 5, Playlist 10 555 is selected, which includes a different version of streaming Song 4 515 along with a plurality of other songs. Since Playlist 10 555 includes a different version of the streaming Song 4 515, the destination device 350 may determine that the other songs 560 in Playlist 10 are similar to Song 4 515 streaming from the source device 300. The destination device 350 may then select one of the other songs 560 (Song 11, Song 12, Song 13, or Song 20) in the Playlist 10 555 as the next song to play at the destination device 350. At the conclusion of streaming Song 4 515, control of media playback may be transferred to the destination device 350. When media playback control is transferred to the destination device 350, the destination device 350 may initiate playback of one of the other songs 560 in Playlist 10 555, which includes the different version of the streaming Song 4 515.

When the destination device 350 initiates playback of the next song, the source device 350 may terminate the peerto-peer device pairing. The source device 300 may power down the after the streaming Song 4 515 concludes or after transferring control of media playback to the destination device 350. In another implementation, the source device 300 may perform any combination of terminating the peer-to-peer device pairing, terminating media playback, closing the media application, or powering down when the streaming Song 4 515 concludes or when control of media playback is transferred to the destination device 350. In such implementations, battery power and processing power are conserved at the source device 300. When media playback control is transferred to the destination device 350, the source device 300 is no longer needed to stream, transfer, control, or aid in media playback.

In still another example, if the destination device 350 does not have any version of Song 4 515 streaming from the source device 300, the destination device 350 may determine another song having similar characteristics to the streaming Song 4 515. For example, the destination device 350 may select a song stored locally at the destination device 350 with a similar artist, album, genre, title, release date, time period, or other characteristic similar to the streaming Song 4 515. When the peer-to-peer device pairing is established, the destination device 350 may interrupt the playback of the streaming Song 4 515 at the source device 300 and initiate playback of a similar song at the destination device 350. When the similar song is played by the destination device 350, media playback at the source device 300 may be terminated. The peer-to-peer device pairing may also be terminated, which conserves battery and processing power at the source device 300. Although playback of the streaming Song 4 515 is interrupted at the source device 300, a similar song may be played at the destination device 350 to mitigate the interruption of the media playback experience to the user.

Figure 6:
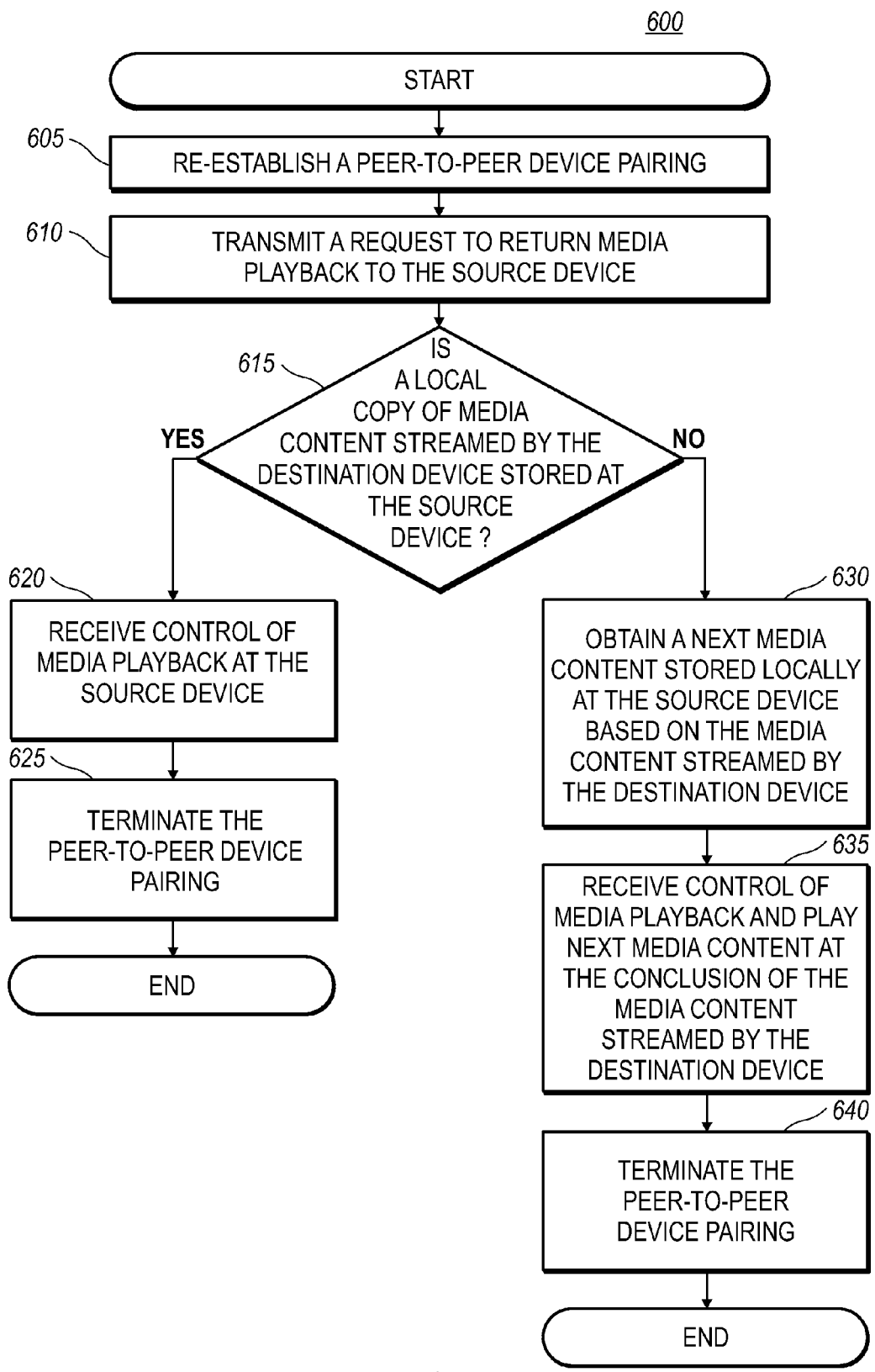
FIG. 6 is a flow chart illustrating a process for transferring media playback control in accordance with an example implementation, where the source device requests the return of media playback control from the destination device.

FIG. 6 illustrates a flow chart of an example method of transferring control of media playback where the source device 300 requests a return of media playback. In FIG. 6, the method may begin at block 605. At block 605, the source device 300 may re-establish a peer-to-peer device pairing with the destination device 350. For example, the source device 300 may re-establish the peer-to-peer device pairing by initiating a Bluetooth™ connection with the destination device 350, selecting a wireless network connection with the destination device 350, or establishing any other peer-to-peer device pairing as discussed above. While establishing the peer-to-peer device pairing, the destination device 350 may stream media content to the source device 300. After the peer-to-peer device pairing is established, the method may proceed to block 610.

At block 610, a request to return control of media playback to the source device 300 is transmitted to the destination device 350. The request may include a contact input, a gesture input, a selection of an option or icon in the media playback application, or any other similar request to return media playback control to the source device 300. For example, the source device 300 may be swiped or waved adjacent a sensor of the destination device 350 to transmit a request to return media playback to the source device 300. For example, a radio frequency identification (RFID) transmitter may be coupled to the source device 300 and an RFID receiver may be coupled to the destination device 350. When the source device 300 is swiped or waved adjacent the destination device 350, the RFID receiver at the destination device 350 may detect the RFID transmitter at the source device 300 to trigger a request to return media playback control to the source device 300. After receiving the request to return the media playback control, the method may proceed to block 615.

At block 615, a determination is made of whether to return control of media playback to the source device 300 based on characteristics of the media content at the source device 300. For example, control of media playback may return based on whether a local copy of the media content, such as a third media item, streaming from the destination device 350 is stored at the source device 300. In one example, the determination may be made at the processor 305 of the source device 300. In response to the request to return media playback control to the source device 300, the destination device 350 may transmit destination data providing characteristics of the third media item streaming from the destination device 350. Such characteristics may include a file format, playlist data, title, a BPM, a bit rate, an album, a release date, a genre, an artist, a director, or the like. The source device 300, via the processor 305, may compare characteristics of locally stored media content with characteristics from the third media item streaming from the destination device 350. If the source device 300 determines that a local copy of the third media item is stored thereon, the method may proceed to block 620.

At block 620, playback of the third media item may be transferred to the source device 300. Transferring control of media playback to the source device 300 may be immediate. That is, the source device 300 may receive control of media playback and initiate playback of the third media item at the position that the third media item was streaming just prior to when media playback control was transferred from the destination device 350 to the source device 300. In other examples, the destination device 350 may transmit buffer data associated with the third media item to the source device 300 until the local copy of the third media item is retrieved at the source device 300. Control of media playback may be transferred to the source device 300 while the local copy is being retrieved. Then, after the local copy is retrieved, the source device 300 may play the local copy of the third media item. The source device 300 may also control the playback of subsequent media content. After media playback is transferred to the source device 300, the method may proceed to block 625.

At block 625, the peer-to-peer device pairing may be terminated. For example, media playback at the destination device 350 may be terminated in response to transferring control of media playback to the source device 300. In another implementation, the destination device 350 may power down after media playback control is transferred to the source device 300.

If a local copy of the third content item is not stored at the source device 300, the method may proceed to block 630. At block 630, the source device 300 may determine and select a next media item, or a fourth media item, stored locally at the source device 300 based on the third media item being streamed by the destination device 350. For example, the processor 305 of the source device 300 may compare characteristics of the third media item to characteristics of media content locally stored at the source device 300 to determine and select the next media content having similar characteristics to the third media item. The similar characteristics may include a similar artist, genre, title, album, release date, director, or the like. The next media item may be selected to play at the conclusion of the third media item. After the next media item is determined, the method may proceed to block 635.

At block 635, when the third media item streaming from the destination device 350 concludes, the next media item may be played at the source device 300. In one implementation, the destination device 350 may play the third media item from the destination device 350 and transmit the audio associated therewith to the source device 300 such that the third media item is output from the source device 300. When the third media item concludes, playback of media content may be transferred to the source device 300 and the next media item may be played at the source device 300. In another implementation, the destination device 350 may continue playback of the third media item at the destination device 350 until the source device 300 retrieves and cues up the next media item for playback at the source device 300. At the conclusion of the third media item, playback of media content may be transferred to the source device 300, and the next media item may be initiated at the source device 300. After the next media item is played at the source device 300, the method may proceed to block 640.

At block 640, the peer-to-peer device pairing may be terminated. For example, media playback at the destination device 350 may be terminated in response to transferring control of media playback to the source device 300. In another implementation, the destination device 350 may power down after media playback control is transferred to the source device 300.

Figure 7:
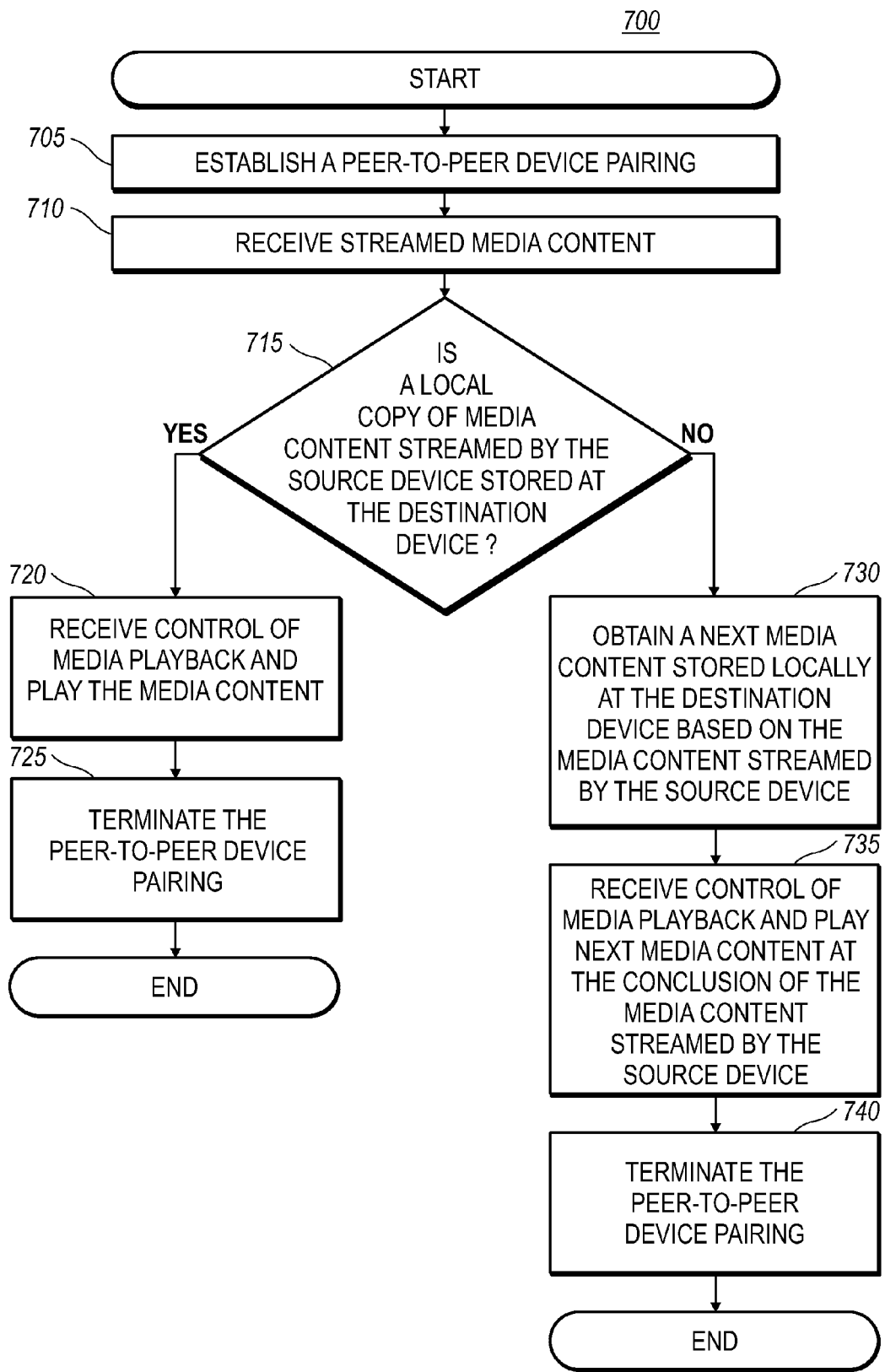
FIG. 7 is a flow chart illustrating a process for transferring media playback control from the perspective of a destination device to which media playback control is transferred according to one example implementation.

FIG. 7 illustrates an example flow chart of a method of transferring control of media playback between electronic devices from the perspective of the electronic device receiving media playback control. In FIG. 7, the destination device 350 is the electronic device to which media playback is transferred. The source device 300 is the electronic device transferring control of media playback. The method may begin at block 705 by establishing a peer-to-peer device pairing between the destination device 350 and the source device 300. After the peer-to-peer device pairing is established, the method may proceed to block 710.

At block 710, the destination device 350 receives streaming media content from the source device 300. In addition to receiving the streaming media content, the destination device 350 may receive control data from the source device 300. For example, the control data may include characteristics of the streaming media content such as a beats per minute (BPM), a bit rate, an album, a release date, a genre, an artist, a director, or the like. After the streaming media content is received, the method may proceed to block 715.

At block 715, a determination is made of whether to transfer control of media playback to the destination device 350 based on characteristics of media content at the destination device 350. Specifically, in FIG. 7, the determination to transfer control is based on whether a local copy of the media content streaming from the source device 300 is stored at the destination device 350. The determination may include a comparison of characteristics of the media content stored locally at the destination device 350 and characteristics of the media content streaming from the source device 300. If the characteristics of the streaming media content substantially match media content stored locally at the destination device 350, a determination may be made that control of media playback should be transferred to the destination device 350. For example, control of media playback may be transferred if a local copy of the media content streaming from the source device 300 is stored locally at the destination device 350. If a local copy of the media content streaming from the source device 300 is stored locally at the destination device 350, the method may proceed to block 720.

At block 720, the destination device 350 may receive control of media playback. That is, control of media playback is transferred to the destination device 350. For example, the local copy of the media content, which corresponding to media content streaming from the source device 300, is controlled by the destination device 350. The destination device 350 may also play the local copy of the media content from a local storage medium. In one example, the destination device 350 may receive buffer data from the source device 300, such that the source device 300 continues to stream the media content to the source device 300 until the local copy of the media content is retrieved. That is, the destination device 350 may buffer playback of the media content until the local copy of the media content is retrieved for playback. After the local copy of the media content is retrieved, control of media playback may be transferred or handed over to the destination device 350. After the media playback is transferred to the destination device 350, the method may proceed to block 725.

At block 725, the peer-to-peer device pairing may be terminated. For example, media playback at the source device 300 may be terminated in response to transferring control of media playback to the destination device 350. In another implementation, the source device 300 may power down after media playback is transferred to the destination device 350.

If a local copy of the media content streaming from the source device 300 is not stored at the destination device 350, the method may proceed to block 730. At block 730, the destination device 350 may select a next media item, such as the second media item, stored locally at the destination device 350 based on characteristics of the media content streaming from the source device 300. The next media item may be a media item having similar characteristics to the media content streaming from the source device 300. Similar characteristics may include a same or similar artist, genre, title, album, release date, director, or the like. The next media item may be selected and played following the media content streaming from the source device 300. After the next piece of media content is determined, the method may proceed to block 735.

At block 735, when the media content streaming from the source device 300 concludes, the destination device 350 receives control of media playback. For example, the destination device 350 may receive control of media playback and may initiate playback of the next media item. In one implementation, at the conclusion of the playing the media content streaming from the source device 300, the next media item may be played locally at the destination device 350. In another implementation, the source device 300 may continue playing the streaming media content until the destination device 350 retrieves and cues the next media item for playback. At the conclusion of the media content streaming from the source device 300, playback of media content may be transferred to the destination device 350, and the next media item may be initiated by the destination device 350. After control of media playback is transferred to the destination device 350, the method may proceed to block 740.

At block 740, the peer-to-peer device pairing may be terminated. For example, media playback at the source device 300 may be terminated in response to transferring control of media playback to the destination device 350. In another implementation, the source device 300 may power down after media playback is transferred to the destination device 350.

While the above FIGS. 1-7 have been described as transferring control of media playback from one electronic device to another electronic device, those of ordinary skill in the art will appreciate media playback may be transferred between a plurality of electronic devices. For example, one electronic device may transfer media playback to a plurality of electronic devices to broadcast the media content to a larger audience. Also, while media content has been described with respect to music such as songs, those of ordinary skill in the art will appreciate that media content may include videos, movies, television shows, video clips, audio clips, or any other audiovisual content.

In another implementation, control of media playback may be transferred in response to detecting a change of connectivity status between electronic devices. For example, a change in media playback control may be initiated automatically in response to a change in connectivity status between electronic devices. Alternatively, the change in media playback control may be initiated automatically in response change in signal strength of the peer-to-peer device pairing. For example, the source device 300 may be a home stereo system and the destination device 350 may be a smartphone. The destination device 350 may receive streaming media content from the source device 300 over the wireless connection.

When the destination device 350 moves outside a signal coverage area, the source device 300 detects the change in connectivity status and transmits control data to the source device 300 over a local area network and a data network of a cellular service provider. For example, if the user leaves his home with his smartphone and moves outside an area covered by the peer-to-peer device pairing, the destination device 350 may automatically access the data network to request control of media playback. The destination device 350 may access a local area network through the data network in order to communicate with the source device 300 and continue receiving streaming media content. A network change may be determined when the network providing the destination device 350 with streaming content changes to a data network of a cellular service provider or a cellular network. This change in network may trigger a request to transfer control of media playback from the source device 300 to the destination device 350.

In another example, the request to transfer control of media playback may be initiated or prompted in response to a determination that an available bandwidth for sharing content, a signal strength, or a network has changed in one or both of the source device 300 or the destination device 350. When the network change is detected, the source device 300 may stream media content to the destination device 350 via a Wi-Fi connection or the data network. The determination of when to initiate a change of control of media playback may be performed as discussed in any of the above-described implementations.

Figure 8:
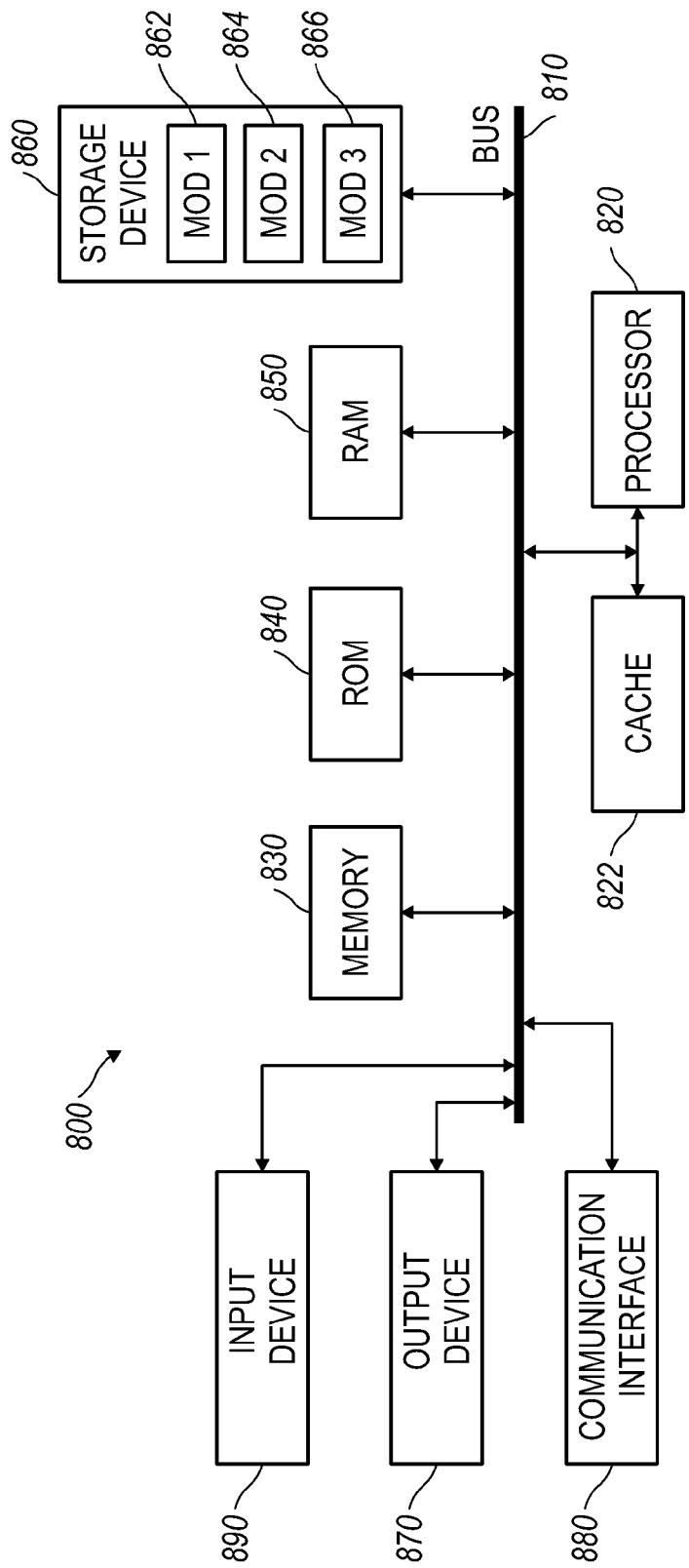
FIG. 8 illustrates a computing device system according to an example implementation.

The disclosure now turns to a brief description of a basic general purpose system or computing device, as shown in FIG. 8, which may be employed to practice the concepts is disclosed herein. The components disclosed herein may be incorporated in whole or in part into handsets, transmitters, servers, and/or any other electronic or other computing device.

With reference to FIG. 8, an example system 800 includes a general-purpose computing device 800 or electronic device; including a processing unit (CPU or processor) 820 and a system bus 810 that couples various system components to the processor 820. The system components include a system memory 830 such as read only memory (ROM) 840 and random access memory (RAM) 850. The system 800 may include a cache 822 of high speed memory connected directly with, in close proximity to, or integrated as part of the processor 820. The system 800 copies data from the memory 830 and/or the storage device 860 to the cache 822 for quick access by the processor 820. In this way, the cache provides a performance boost that avoids processor 820 delays while waiting for data. These and other modules may control or be configured to control the processor 820 to perform various actions. Other system memory 830 may be available for use as well. The memory 830 may include multiple different types of memory with different performance characteristics. It may be appreciated that the disclosure may operate on a computing device 800 with more than one processor 820 or on a group or cluster of computing devices networked together to provide greater processing capability. The processor 820 may include any general purpose processor and a hardware module or software module, such as module 1 862, module 2 864, and module 3 866 stored in storage device 860 configured to control the processor 820 as well as a special-purpose processor where software instructions are incorporated into the actual processor design. The processor 820 may be a completely self-contained computing system, containing multiple cores or processors, a bus, memory controller, cache, etc. A multi-core processor may be symmetric or asymmetric.

The system bus 810 may be any of several types of bus structures including a memory bus or memory controller, a peripheral bus, and a local bus using any of a variety of bus architectures. A basic input/output system (BIOS) stored in ROM 840 or the like, may provide the basic routine that helps to transfer information between elements within the computing device 800, such as during start-up. The computing device 800 further includes storage devices 860 such as a hard disk drive, a magnetic disk drive, an optical disk drive, tape drive or the like. The storage device 860 may include software modules 862, 864, 866 for controlling the processor 820. Other hardware or software modules are contemplated. The storage device 860 is connected to the system bus 810 by a drive interface. The drives and the associated computer readable storage media provide non-volatile storage of computer readable instructions, data structures, program modules, and other data for the computing device 800. In one aspect, a hardware module that performs a particular function includes the software component stored in a non-transitory computer-readable medium in connection with the necessary hardware components, such as the processor 820, bus 810, display 870, and so forth, to carry out the function. The basic components are known to those of skill in the art and appropriate variations are contemplated depending on the type of device, such as whether the device 800 is a small, handheld computing device, a desktop computer, or a computer server.

Although the example described herein employs the hard disk 860, it should be appreciated by those skilled in the art that other types of computer readable media which may store data that are accessible by a computer, such as magnetic cassettes, flash memory cards, digital versatile disks, cartridges, random access memories (RAMs) 850, read only memory (ROM) 840, a cable or wireless signal containing a bit stream and the like, may also be used in the example operating environment. Non-transitory computer-readable storage media expressly exclude media such as energy, carrier signals, electromagnetic waves, and signals per se.

To enable user interaction with the computing device 800, an input device 890 represents any number of input mechanisms, such as a microphone for speech, a touch-sensitive screen for gesture or graphical input, keyboard, mouse, motion input, speech and so forth. An output device 870 may also be one or more of a number of output mechanisms known to those of skill in the art. In some instances, multimodal systems enable a user to provide multiple types of input to communicate with the computing device 800. The communications interface 880 generally governs and manages the user input and system output. There is no restriction on operating on any particular hardware arrangement and therefore the basic features here may easily be substituted for improved hardware or firmware arrangements as they are developed.

For clarity of explanation, the illustrative system example is presented as including individual functional blocks including functional blocks labeled as a "processor" or processor 820. The functions these blocks represent may be provided through the use of either shared or dedicated hardware, including, but not limited to, hardware capable of executing software and hardware, such as a processor 820, that is purpose-built to operate as an equivalent to software executing on a general purpose processor. For example the functions of one or more processors presented in FIG. 8 may be provided by a single shared processor or multiple processors. (Use of the term "processor" should not be construed to refer exclusively to hardware capable of executing software.) Illustrative examples may include microprocessor and/or digital signal processor (DSP) hardware, read-only memory (ROM) 840 for storing software performing the operations discussed below, and random access memory (RAM) 850 for storing results. Very large scale integration (VLSI) hardware examples, as well as custom VLSI circuitry in combination with a general purpose DSP circuit, may also be provided.

The logical operations of the various examples are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 800 shown in FIG. 8 may practice all or part of the recited methods, may be a part of the recited systems, and/or may operate according to instructions in the recited non-transitory computer-readable storage media. Such logical operations may be implemented as modules configured to control the processor 820 to perform particular functions according to the programming of the module. For example, FIG. 8 illustrates three modules Mod 1 862, Mod 2 864 and Mod 3 866 which are modules configured to control the processor 820. These modules may be stored on the storage device 860 and loaded into RAM 850 or memory 830 at runtime or may be stored as would be known in the art in other computer-readable memory locations.

Examples within the scope of the present disclosure may also include tangible and/or non-transitory computer-readable storage media for carrying or having computer-executable instructions or data structures stored thereon. Such non-transitory computer-readable storage media may be any available media that may be accessed by a general purpose or special purpose computer, including the functional design of any special purpose processor as discussed above. By way of example, and not limitation, such non-transitory computer-readable media may include RAM, ROM, EEPROM, CD-ROM or other optical disk storage, magnetic disk storage or other magnetic storage devices, or any other medium which may be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various examples described above are provided by way of illustration only and should not be construed to limit the scope of the disclosure. For example, the principles herein apply not only to a smartphone device but to other devices capable of detecting communications such as a laptop computer. Those skilled in the art will readily recognize various modifications and changes that may be made to the principles described herein without following the example implementations and applications illustrated and described herein, and without departing from the scope of the disclosure.

We claim:

1. A method of transferring control of media playback between a source device and a destination device, the method comprising:
   initiating playback of media content at the source device;
   establishing, at the source device, a peer-to-peer device pairing with the destination device, wherein the peer-to-peer device pairing includes a wireless connection between the source device and the destination device;
   streaming, from the source device, the media content for media playback to the destination device, where the media content is streamed through a wireless connection between the source device and the destination device;

comparing, at the source device, characteristics of the media content with characteristics of media content locally accessible at the destination device, wherein the media content locally accessible at the destination device is stored locally at the destination device or accessible to the destination device, and wherein the media content locally accessible at the destination device or accessible to the destination device is from a different source than the media content streaming from the source device;

while streaming the media content from the source device to the destination device, determining, at the source device, whether to transfer control of the media playback to the destination device based on the comparison of the characteristics of the media content locally accessible at the destination device;

transferring control of the media playback to the destination device when a predetermined number of characteristics of the media content locally accessible at the destination device match the characteristics of the media content streaming from the source device to the destination device, wherein transferring control of the media playback enables the destination device to control playback of the media content and play a local copy of the media content; and terminating the peer-to-peer device pairing when control of the media playback to the destination device is transferred, wherein terminating the peer-to-peer device pairing includes terminating the wireless connection.

2. The method of claim 1, wherein the characteristics of media content streaming from the source device to the destination device comprise at least one of a file format, a title, playlist data, a beats per minute, a bit rate, an album, a release date, a genre, an artist, and a director.

3. The method of claim 1, wherein determining whether to transfer control of the media playback comprises:
determining whether a local copy of the media content streaming to the destination device is stored at the destination device based on a comparison of the characteristics of the media content stored at the destination device and the characteristics of the media content streaming to the destination device.

4. The method of claim 3, further comprising:
streaming the media content until the conclusion of the media content upon determining that the local copy is not stored at the destination device; and
transferring control of media playback to the destination device at the conclusion of the media content streaming to the destination device.

5. The method of claim 3, further comprising:
transmitting buffer data for buffering playback of the media content at the destination device upon determining that the local copy is stored at the destination device;
retrieving the local copy of the media content;
receiving an indication that the local copy is retrieved;
transferring control of media playback from the source device to the destination device in response to receiving the indication; and
terminating the peer-to-peer device pairing.

6. The method of claim 1, wherein determining whether to transfer control of media playback comprises:
determining whether the media content locally accessible at the destination device comprises a playlist having media content with characteristics substantially similar to the media content streaming to the destination device; and
transferring control of the media playback to the destination device in response to determining the media content locally accessible at the destination device comprises the playlist.

7. The method of claim 1, further comprising:
detecting a decrease in strength of connectivity of the peer-to-peer device pairing; and
determining whether to transfer control of the media playback to the destination device in response to detecting the decrease in strength of connectivity.

8. The method of claim 7, wherein detecting the decrease in the strength of connectivity is based at least in part on an available bandwidth, a signal strength, and a network change.

9. The method of claim 1, further comprising:
re-establishing the peer-to-peer device pairing;
transmitting a request to the destination device to return control of the media playback to the source device;
receiving data indicating a second media item is playing at the destination device in response to the request; and
resuming control of the media playback at the source device based at least in part on characteristics of the second media item playing at the destination device and characteristics of media content at the source device.

10. The method of claim 9, wherein resuming control of media playback comprises:
determining whether a copy of the second media item is locally stored at the source device;
receiving control of the media playback at the source device in response to determining that the copy of the second media item is locally stored at the source device; and
terminating the re-established peer-to-peer device pairing.

11. The method of claim 9, wherein resuming control of media playback comprises:
determining whether a copy of the second media item is locally stored at the source device;
determining a third media item based at least in part on characteristics of the second media item, the third media item being locally stored at the source device in response to a determination that no copy of the second media item is locally stored at the source device;
receiving control of the media playback at the source device at a conclusion of the second media item;
terminating the re-established peer-to-peer device pairing; and
initiating playback of the third media item.

12. An electronic device comprising:
a processor that communicates with a non-transitory computer-readable storage medium having instructions stored thereon that, when executed by the processor, cause the processor to:
initiate playback of media content;
establish a peer-to-peer device pairing with a destination device;
stream the media content from the electronic device to the destination device, where the media content is streamed through a wireless connection between the electronic device and the destination device;
receive characteristics of media content locally accessible at the destination device;
compare characteristics of the media content streaming to the destination device with characteristics of the media content locally accessible at the destination device, wherein the media content locally accessible at the destination device is stored locally at the destination device or accessible to the destination device, and wherein the media content locally accessible at the destination device or accessible to the destination device is from a different source than the media content streaming from the source device;

while streaming the media content from the electronic device to the destination device, determine whether to transfer control of media playback to the destination device based on the characteristics of media content locally accessible at the destination device;

transfer control of the media playback to the destination device when a predetermined number of characteristics of the media content locally accessible at the destination device match the characteristics of the media content streaming to the destination device, wherein transferring control of the media playback enables the destination device to control playback of the media content and play a local copy of the media content; and terminate the peer-to-peer device pairing when control of media playback to the destination device is transferred.

13. The electronic device of claim 12, wherein the characteristics of media content streaming to the destination device comprises at least one of a file format, a title, playlist data, a beats per minute, a bit rate, an album, a release date, a genre, an artist, and a director.

14. The electronic device of claim 12, wherein the instructions for determining whether to transfer control of the media playback comprise instructions that, when executed by the processor, cause the processor to:

determine whether a local copy of the media content streaming to the destination device is stored at the destination device based on a comparison of the characteristics of the media content stored at the destination device and the characteristics of the media content streaming to the destination device.

15. The electronic device of claim 12, wherein the non-transitory computer-readable storage medium stores further instructions that, when executed by the processor, cause the processor to:

detect a decrease in strength of connectivity of the peer-to-peer device pairing; and determine whether to transfer control of the media playback to the destination device in response to detecting the decrease in strength of connectivity.

16. A non-transitory computer-readable storage medium for transferring control of media playback between electronic devices, the non-transitory computer-readable storage medium comprising instructions that, when executed by an electronic device, cause the electronic device to:

initiate playback of media content at the electronic device;

establish a peer-to-peer device pairing with a destination device;

stream the media content from the electronic device to the destination device, where the media content is streamed through a wireless connection between the electronic device and the destination device;

receive characteristics of media content locally accessible at the destination device;

compare characteristics of the media content streaming to the destination device with characteristics of the media content locally accessible at the destination device, wherein the media content locally accessible at the destination device is stored locally at the destination device or accessible to the destination device, and wherein the media content locally accessible at the destination device or accessible to the destination device is from a different source than the media content streaming from the source device;

while streaming from the electronic device the media content to the destination device, determine whether to transfer control of the media playback to the destination device based on characteristics of the media content locally accessible at the destination device;

transfer control of the media playback to the destination device when a predetermined number of characteristics of the media content locally accessible at the destination device match the characteristics of the media content streaming to the destination device, wherein transferring control of the media playback enables the destination device to control playback of the media content and play a local copy of the media content; and terminate the peer-to-peer device pairing when control of the media playback to the destination device is transferred.

17. The non-transitory computer-readable storage medium of claim 16, wherein the computer-readable storage medium stores further instructions that, when executed by the electronic device, cause the computing device to:

detect a decrease in strength of connectivity of the peer-to-peer device pairing; and determine whether to transfer control of the media playback to the destination device in response to detecting the decrease in strength of connectivity.

* * * * *